(12) United States Patent
Kim

(10) Patent No.: US 11,600,275 B2
(45) Date of Patent: Mar. 7, 2023

(54) ELECTRONIC DEVICE AND CONTROL METHOD THEREOF

(71) Applicant: Samsung Electronics Co., Ltd., Suwon-si (KR)

(72) Inventor: Dongwan Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 52 days.

(21) Appl. No.: 17/102,959

(22) Filed: Nov. 24, 2020

(65) Prior Publication Data
US 2021/0158819 A1    May 27, 2021

(30) Foreign Application Priority Data
Nov. 25, 2019  (KR) .................. 10-2019-0152488

(51) Int. Cl.
*G10L 15/22*    (2006.01)
*G10L 15/08*    (2006.01)
*G10L 15/06*    (2013.01)

(52) U.S. Cl.
CPC ............ *G10L 15/22* (2013.01); *G10L 15/063* (2013.01); *G10L 15/083* (2013.01); *G10L 2015/223* (2013.01); *G10L 2015/226* (2013.01)

(58) Field of Classification Search
CPC ......... G10L 15/02; G10L 15/04; G10L 15/06; G10L 15/22
USPC ........................................................ 704/275
See application file for complete search history.

(56) References Cited

U.S. PATENT DOCUMENTS

| | | | |
|---|---|---|---|
| 10,553,219 B2* | 2/2020 | Jung | G10L 15/22 |
| 10,978,058 B2* | 4/2021 | Yoo | G10L 15/20 |
| 11,145,298 B2* | 10/2021 | Maker | G10L 21/0232 |
| 2013/0073293 A1 | 3/2013 | Jang et al. | |
| 2015/0193693 A1 | 7/2015 | Vasseur et al. | |
| 2016/0140954 A1 | 5/2016 | Park | |
| 2016/0372110 A1 | 12/2016 | Waltermann et al. | |
| 2017/0110117 A1 | 4/2017 | Chakladar et al. | |

FOREIGN PATENT DOCUMENTS

| | | |
|---|---|---|
| KR | 10-1619262 | 5/2016 |
| KR | 10-2019-0065200 | 6/2019 |
| KR | 10-2019-0080833 | 7/2019 |

OTHER PUBLICATIONS

International Search Report dated Mar. 9, 2021 in International Patent Application No. PCT/KR2020/015830.
Extended European Search Report dated Jun. 24, 2022 in European Patent Application No. 20892370.6 (7 pages).

* cited by examiner

*Primary Examiner* — Susan I McFadden
(74) *Attorney, Agent, or Firm* — Staas & Halsey LLP

(57) ABSTRACT

An electronic device performing voice recognition on user utterance based on first voice assistance. The electronic device may receive information on recognition characteristic of second voice assistance for user utterance from an external device and adjust recognition characteristic of the first voice assistance based on the information on the recognition characteristic of the second voice assistance.

20 Claims, 13 Drawing Sheets

ELECTRONIC DEVICE AND CONTROL METHOD THEREOF

CROSS-REFERENCE TO RELATED APPLICATION

This application is based on and claims priority under 35 U. S. C. § 119 to Korean Patent Application No. 10-2019-0152488 filed on Nov. 25, 2019 in the Korean Intellectual Property Office, the disclosure of which is herein incorporated by reference in its entirety.

BACKGROUND

1. Field

The disclosure relates to an electronic device and a control method thereof, and more particularly, to an electronic device that performs voice recognition using voice assistance and a control method thereof.

2. Discussion of Related Art

A voice recognition function, which has been actively researched in recent years, is a function of controlling an electronic device to perform a specific operation according to a recognition result when an utterer intends a specific operation of the electronic device and utters a voice corresponding to the specific operation. The electronic device may include voice assistance to perform a voice recognition function. Here, the voice assistance may include a hardware/software component that recognizes the uttered voice.

SUMMARY

In accordance with an aspect of the disclosure, an electronic device includes: a communication interface; and a processor that performs voice recognition on user utterance based on first voice assistance, in which the processor receives information on recognition characteristic of second voice assistance for user utterance from an external device through the communication interface, and adjusts recognition characteristic of the first voice assistance based on the received information on the recognition characteristic of the second voice assistance.

When a recognition success rate of the second voice assistance is higher than that of the first voice assistance, the processor may adjust the recognition characteristic of the first voice assistance to correspond to the recognition success rate of the second voice assistance.

The processor may adjust the recognition characteristic of the first voice assistance based on information on the recognition characteristic of the second voice assistance having the highest recognition success rate among the plurality of recognition characteristics of the second voice assistance.

The processor may identify a type of the second voice assistance, and may receive the information on the recognition characteristic of the second voice assistance through the communication interface when the identified type of the second voice assistance is the same as the type of the first voice assistance.

The processor may control to transmit information corresponding to learning utterance to an external device through the communication interface, and adjust the recognition characteristic of the first voice assistance based on the transmitted information.

The learning utterance may be provided for each of the plurality of different voice characteristics.

The voice characteristic may include user's voice characteristic.

The processor may control first learning noise to be output, and adjust the recognition characteristic of the first voice assistance based on the output first learning noise.

The processor may control to transmit information corresponding to second learning noise to a second external device through the communication interface, and adjust the recognition characteristic of the first voice assistance based on the information corresponding to the second learning noise.

The processor may receive a request to output the learning utterance from the external device through the communication interface, and control the learning utterance to be output.

The processor may transmit the information on the recognition characteristic of the first voice assistance to the external device through the communication interface.

The processor may control to transmit the information corresponding to the learning utterance to the external device through the communication interface when the user is absent.

To accomplish the above object of the disclosure, a control method of an electronic device includes: performing voice recognition on user utterance based on first voice assistance; receiving information on recognition characteristic of second voice assistance for the user utterance from an external device; and adjusting recognition characteristic of the first voice assistance based on the received information on the recognition characteristic of the second voice assistance.

The adjusting of the recognition characteristic of the first voice assistance may include adjusting the recognition characteristic of the first voice assistance to correspond to a recognition success rate of the second voice assistance when the recognition success rate of the second voice assistance is higher than that of the first voice assistance.

The adjusting of the recognition characteristic of the first voice assistance to correspond to the recognition success rate of the second voice assistance may include adjusting the recognition characteristic of the first voice assistance based on the information on the recognition characteristic of the second voice assistance having the highest recognition success rate among the plurality of recognition characteristics of the second voice assistance.

The receiving of the information on the recognition characteristic of the second voice assistance may include: identifying a type of the second voice assistance; and receiving the information on the recognition characteristic of the second voice assistance when the identified type of the second voice assistance is the same as the type of the first voice assistance.

The control method may further include transmitting information corresponding to learning utterance to the external device, in which the adjusting of the recognition characteristic of the first voice assistance may include adjusting the recognition characteristic of the first voice assistance based on the transmitted information.

The learning utterance may be provided for each of the plurality of different voice characteristics.

The voice characteristic may include user's voice characteristic.

To accomplish the above object, there is provided a recording medium stored with a computer program including a computer-readable code performing a control method of an electronic device, in which the control method of the electronic device includes performing voice recognition on user utterance based on first voice assistance; receiving information on recognition characteristic of second voice assistance for the user utterance from an external device; and adjusting recognition characteristic of the first voice assistance based on the received information on the recognition characteristic of the second voice assistance.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Figure 1:
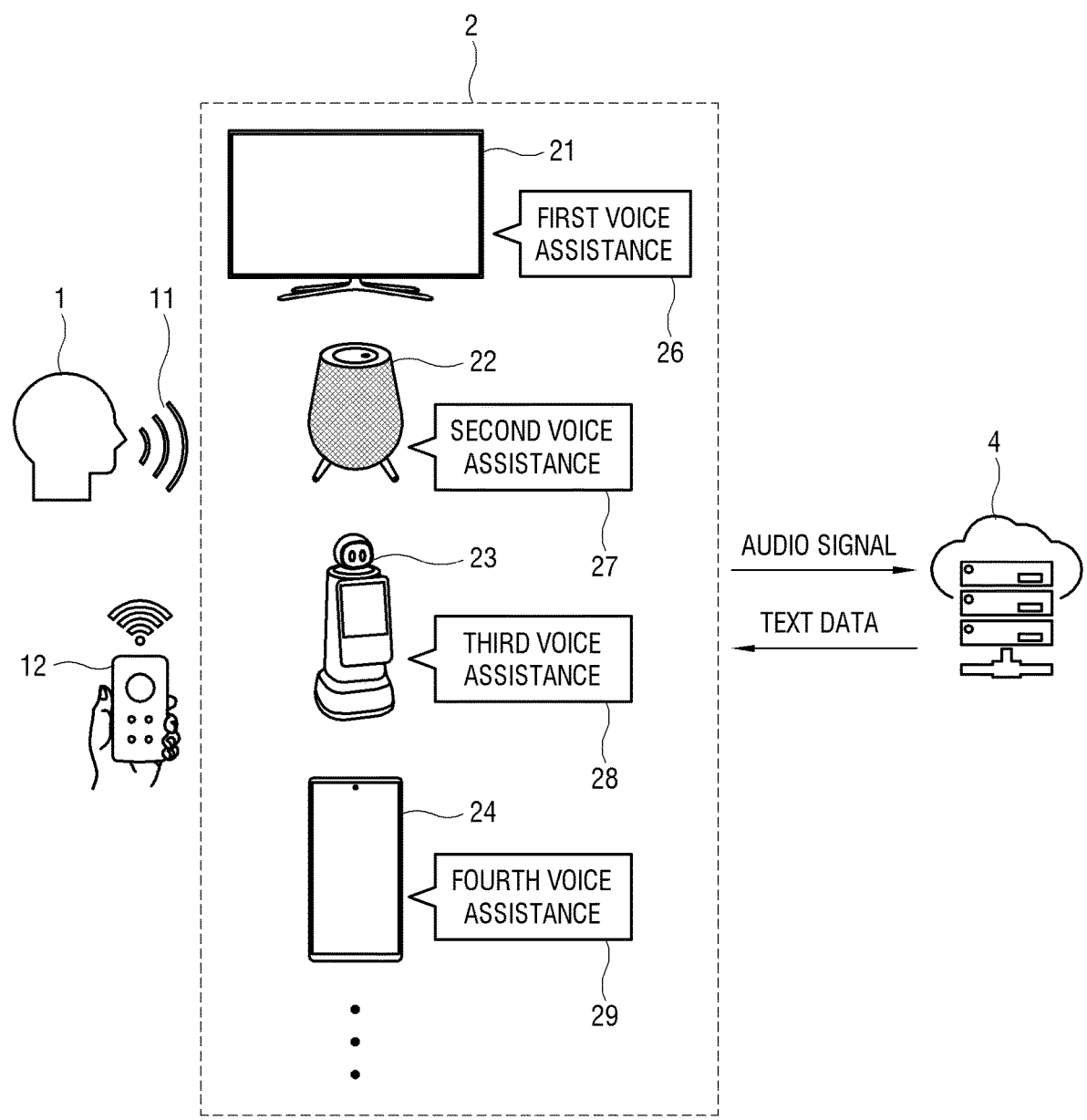
FIG. 1 is a diagram illustrating an electronic device according to an embodiment of the disclosure.

Hereinafter, embodiments according to the disclosure will be described in detail with reference to the accompanying drawings. The description of embodiments below references matters described in the accompanying drawings, and the same reference numerals or symbols illustrated in each drawing indicate components that perform substantially the same operation. In the disclosure, at least one of a plurality of elements refers to not only all of the plurality of components, but also each one or all combinations thereof excluding the rest of the plurality of components.

The disclosure is to provide an electronic device capable of improving the reliability of a voice recognition function by improving voice recognition performance of voice assistance, and a control method thereof.

According to the disclosure, it is possible to provide a control method of an electronic device capable of improving the reliability of the voice recognition function by improving the voice recognition performance of the voice assistance, and the control method thereof.

FIG. 1 illustrates an electronic device 2 according to an embodiment of the disclosure. As illustrated in FIG. 1, the electronic device 2 may perform a voice recognition function. When the electronic device 2 receives user utterance 11 of a user 1, the electronic device 2 may acquire a voice signal for the user utterance 11, perform voice recognition processing on the acquired voice signal, and perform an operation corresponding to a recognition result by the voice recognition processing. When the user utterance 11 is received by a remote controller 12 separate from a main body of the electronic device 2, the electronic device 2 may receive the voice signal corresponding to the user utterance 11 from the remote controller 12, and perform the voice recognition processing on the received voice signal.

The voice recognition processing may be performed in the electronic device 2. In this case, however, since a system load and a storage capacity required for the electronic device 2 are relatively large, at least some of the processes may be performed by at least one server 4 communicatively connected to the electronic device 2 through a network. However, in the following description, for convenience of explanation, it is assumed that the electronic device 2 performs voice recognition processing.

The electronic device 2 may include at least one voice assistance for voice recognition. The voice assistance is a hardware/software component used for the voice recognition processing for the voice signal according to the user utterance 11. The voice assistance may include programs, voice recognition models, and the like. The voice assistance program may be provided in the form of an application. A voice recognition model may include, for example, an acoustic model implemented through statistical modeling of uttered voice according to algorithms such as hidden Markov model (HMM) and dynamic time warping (DTW), language model implemented by a collection of corpus (set of data collected in a form that a computer may process and analyze a text for language research), and the like.

The voice assistance of the electronic device 2 may be provided for each of the plurality of electronic devices 2. For example, when the electronic device 2 is implemented as a TV 21, an artificial intelligence speaker 22, an artificial intelligence robot 23, a smartphone 24, and the like, the TV 21, the artificial intelligence speaker 22, the artificial intelligence robot 23, the smartphone 24, and the like may each be provided with first voice assistance 26, second voice assistance 27, third voice assistance 28, fourth voice assistance 29, and the like, respectively. However, since the type of electronic device 2 is not limited thereto, the electronic device 2 may be implemented as various types of devices such as image display devices such as a tablet, a portable media player, a wearable device, a video wall, and an electronic frame, image processing devices such as a set-top box without a display, household appliances such as a refrigerator and a washing machine, and information processing devices such as a computer body. However, in the following description, for convenience of explanation, the voice recognition operation by the first voice assistance 26 of the TV 21 will be described in detail on the assumption that the electronic device 2 is implemented as the TV 21.

When the electronic device 21 is implemented as the TV 21, for example, when the user utterance 11 of "turn up volume" is received from the user 1, the first voice assistance 26 may perform the voice recognition processing on the voice signal of the received user utterance 11 and turn up the volume of the electronic device 21 according to the voice recognition result.

The first voice assistance 26 may have recognition characteristics for the voice recognition processing for the user utterance 11. The recognition characteristics may include, for example, a voice recognition model representing different voice recognition characteristics according to recognition characteristic parameters. The recognition characteristics may be adjusted as the recognition characteristic parameters are changed, and the change in the recognition characteristic parameters may include tuning of the recognition characteristic parameters, adjustment of a predetermined threshold, a change in the voice recognition model, and the like.

In addition, the recognition characteristics may be adjusted for each voice characteristic and for each user characteristic. The voice characteristics may include pronunciation, tone of voice, tone, intensity, speed, frequency, cycle, and the like of the user utterance 11, and the user characteristics may include gender, age, name, residence, nationality, occupation, and the like of the user 1.

The electronic device 21 may perform voice recognition based on the first voice assistance 26 having adjusted recognition characteristics, that is, learned recognition characteristics to increase a recognition success rate and the like of specific user utterance 11, thereby preventing the unrecognition or misrecognition and improving suitability between the utterance intention of the user 1 and the recognition result for the user utterance 11.

As an example of the adjustment of the recognition characteristics, the electronic device 21 may adjust the recognition characteristics of the first voice assistance 26 based on the recognition characteristics of the external device, for example, the artificial intelligence speaker 22. For example, the electronic device 21 may adjust the recognition characteristic parameters of the voice recognition model of the first voice assistance 26 by referring to the recognition characteristic parameters of the voice recognition model of the second voice assistance 27. Since the external device is not limited to the artificial intelligence speaker 22, a plurality of different electronic devices 2 such as the artificial intelligence robot 23 and the smartphone 24 may be used. However, in the following description, for convenience of explanation, it is assumed that the external device is the artificial intelligence speaker 22.

If the second voice assistance 27 of the artificial intelligence speaker 22 has, for example, recognition characteristics reflecting British pronunciation reinforcement trend for the user 1, the electronic device 21 may receive information on the recognition characteristics of the second voice assistance 27 from the artificial intelligence speaker 22 and adjust the recognition characteristics of the first voice assistance 26 based on the received information to reflect the British pronunciation reinforcement trend for the user 1.

In this way, the electronic device 21 may adjust the recognition characteristics of the first voice assistance 26 based on the recognition characteristics of the second voice assistance 27 of the external device 22, and therefore may be less restrictive than the case of using the user utterance 11 from the user 1 or self-learning and may perform more diverse learning. Therefore, it is possible to improve the reliability of the voice recognition function through the improvement of the voice recognition performance.

Figure 2:
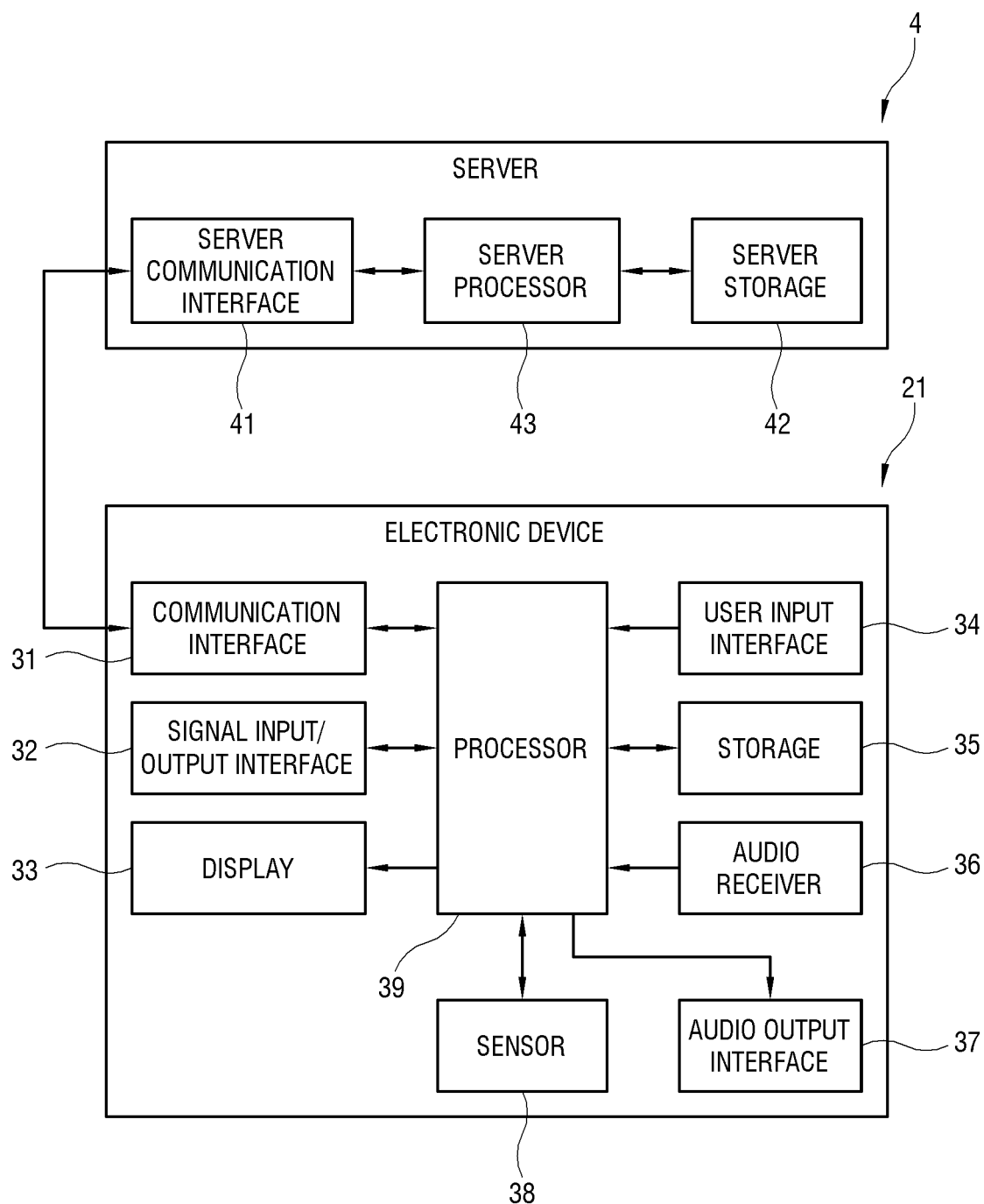
FIG. 2 is a diagram illustrating an example of a configuration of the electronic device of FIG. 1.

FIG. 2 is illustrates an example of a configuration of the electronic device of FIG. 1. Hereinafter, the configuration of the electronic device 21 will be described in detail with reference to FIG. 2. Although the present embodiment describes the case where the electronic device 21 is a TV, the electronic device 21 may be implemented as various types of devices, and therefore the present embodiment does not limit the configuration of the electronic device 21. The electronic device 21 may not be implemented as a display device, and in this case, the electronic device 21 may not include components for displaying an image, such as a display 33. For example, when the electronic device 21 is implemented as a set-top box, the electronic device 21 may output an image signal to an external TV through a signal input/output interface 32.

The electronic device 21 includes a communication interface 31. The communication interface 31 is a two-way communication circuit that includes at least one of components such as communication modules and communication chips corresponding to various types of wired and wireless communication protocols. For example, the communication interface 31 may be implemented as a wireless communication module that performs wireless communication with an access point (AP) according to a Wi-Fi system, a wireless communication module that performs one-to-one direct wireless communication such as Bluetooth, or a LAN card that is connected to a router or a gateway in a wired manner. The communication interface 31 may communicate with another electronic device on the network, for example, an external device 22 or at least one server 4 to transmit and receive a data packet to and from the external device 22 or at least one server 4.

The communication interface 31 may communicate with the remote controller 12, the smartphone, and the like separate from the main body of the electronic device 21. For example, when the remote controller 12, the smartphone, and the like receive a voice signal, the communication interface 31 may receive the voice signal from the remote controller 12, the smartphone, and the like. In this case, a remote controller application may be installed on the smartphone or the like. The communication interface 31 may receive the voice signal from the remote controller 12, the smartphone, or the like, for example, in a method such as Wi-Fi or Bluetooth.

In addition, the communication interface 31 may include a configuration for transmitting and receiving data with the remote controller 12, the smartphone, and the like in a method such as Wi-Fi, Bluetooth, and infrared rays. However, when the communication interface 31 communicates with the external device 22 or at least one server 4, a communication interface that communicates with the external device 22 or at least one server 4, and a communication interface that communicates with the remote controller 12, the smartphone, and the like may be provided to be the same, or may be provided separately.

The electronic device 21 includes the signal input/output interface 32. The signal input/output interface 32 is wired with an external device such as a set-top box or an optical media player in a 1:1 or 1:N (N is a natural number) manner to receive data from the external device or output data to the external device. The signal input/output interface 32 includes a connector, a port, or the like according to a predetermined transmission standard, such as an HDMI port, a DisplayPort, a DVI port, a thunderbolt, and a USB port.

The electronic device 21 includes the display 33. The display 33 includes a display panel that may display an image on a screen. The display panel is provided as a light-receiving structure such as a liquid crystal type or a self-luminous structure such as an OLED type. The display 33 may further include additional components according to the structure of the display panel. For example, if the display panel is a liquid crystal type, the display 33 includes a liquid crystal display panel, a backlight unit that supplies light, and a panel driving substrate that drives a liquid crystal of the liquid crystal display panel. However, the display 33 may be omitted when the electronic device 21 is implemented as a set-top box and the like.

The electronic device 21 includes a user input interface 34. The user input interface 34 includes various types of input interface related circuits that are provided to be manipulated by a user in order to perform user input. The user input interface 34 may be configured in various forms according to the type of the electronic device 21, and the user input interface 34 includes, for example, a mechanical or electronic button unit of the electronic device 21, a touch pad, a touch screen installed on the display 33, and the like.

The electronic device 21 includes a storage 35. The storage 35 stores digitized data. The storage 35 includes a nonvolatile storage that may preserve data regardless of whether the nonvolatile storage is supplied with power, and a volatile memory that may be loaded with data processed by a processor 39 and may not preserve data when the volatile memory is not supplied with power. The storage includes a flash-memory, a hard-disc drive (HDD), a solid-state drive (SSD), a read-only memory (ROM), and the like, and the memory includes a buffer, a random access memory (RAM), and the like. When the voice assistance is implemented in software such as an application, the storage 35 may include voice assistance.

The electronic device 21 includes an audio receiver 36. The audio receiver 36 collects noise, sound, and the like of the external environment including the user utterance 11 of the user 1. The audio receiver 36 transmits the collected voice signal to the processor 39. The audio receiver 36 may be implemented as a microphone, may be installed in the main body of the electronic device 21, or may be installed on the remote controller 12 separate from the main body of the electronic device 21. For example, the voice signal collected through the audio receiver 36 provided on the remote controller 12, the smartphone, and the like may be digitized and received through the communication interface 31.

The electronic device 21 includes an audio output interface 37. The audio output interface 37 may output various audios based on the audio signal. The audio output interface 37 may be implemented as at least one speaker. The audio output interface 37 may be installed on the electronic device 21 or may be implemented as an external speaker provided outside. In this case, the electronic device 21 may transmit an audio signal to an external speaker in a wired or wireless manner.

The electronic device 21 includes a sensor 38. The sensor 38 may include at least one sensor for detecting a movement, a position, or the like of the user 1. As an example, the sensor 38 may include a distance sensor to detect the movement, the position, or the like of the user 1 with respect to the electronic device 21. The distance sensor may emit, for example, infrared rays, ultrasonic waves, and the like, and measure the movement, position, and the like of the user 1 based on the difference between the time when the infrared rays, the ultrasonic waves, and the like are emitted and the time when the infrared rays, the ultrasonic waves, and the like are reflected by the user 1 and the like and returned. However, the sensor 38 is not limited thereto, and therefore may further include an image acquisition unit for imaging or photographing a front surface of the electronic device 21, and may detect the movement, the position, and the like of the user 1 based on the image acquired by the image acquisition unit. The image acquisition unit may be implemented as at least one camera.

The electronic device 21 includes the processor 39. The processor 39 includes one or more hardware processors implemented as a CPU, a chipset, a buffer, a circuit, and the like that are mounted on a printed circuit board, and may be implemented as a system on chip (SOC) depending on the design method. The processor 39 includes modules corresponding to various processes such as a demultiplexer, a decoder, a scaler, an audio digital signal processor (DSP), and an amplifier when the electronic device 21 is implemented as a display device. Here, some or all of these modules may be implemented as SOC. For example, a module related to image processing such as a demultiplexer, a decoder, and a scaler may be implemented as an image processing SOC, and an audio DSP may be implemented as a separate chipset from the SOC.

The processor 39 may perform the voice recognition processing on the voice signal of the user utterance 11 acquired through the audio receiver 36 according to the recognition characteristics of the first voice assistance 26. However, when the voice recognition processing for the voice signal is performed in at least one server 4, the processor 39 may transmit the voice signal acquired through the audio receiver 36 to at least one server 4 through the communication interface 31, receive text data that is the result of the voice signal recognition from at least one server 4 through the communication interface 31, and process the text data received from at least one server 4, thereby performing the operation that the text data indicates.

In particular, the processor 39 may receive the information on the recognition characteristics of the second voice assistance 27 for the user utterance 11 from the external device 22, and adjust the recognition characteristics of the first voice assistance 26 based on the information on the recognition characteristics of the second voice assistance 27.

However, since the configuration of the electronic device 21 is not limited to that illustrated in FIG. 2, some of the above-described configurations may be excluded, or the configurations other than the above configuration may be included according to the design method.

Hereinafter, the configuration of the server 4 will be described in detail with reference to FIG. 2.

The server 4 includes a server communication interface 41. The server communication interface 41 is a two-way communication circuit that includes at least one of components such as communication modules and communication chips corresponding to various types of wired and wireless communication protocols. The server communication interface 41 supports communication standards corresponding to the communication interface 31 of the electronic device 21, so various types of clients including the electronic device 21 may communicate with each other through a network through a wide area network.

The server 4 includes a server storage 42. The server storage 42 performs operations such as reading, writing, modifying, deleting, and updating data by the server processor 43. The server storage 42 includes various nonvolatile memories and volatile memories such as a flash-memory, a HDD, an SSD, a buffer, and a RAM. The server storage 42 may include voice assistance for voice recognition processing for a voice signal. The voice assistance may be provided in various ways for different groups of utterers.

The server 4 includes a server processor 43. The server processor 43 includes one or more hardware processors implemented as a CPU, a chipset, a buffer, a circuit, and the like that are mounted on a printed circuit board, and may be implemented as a system on chip (SOC) depending on the design method. The server processor 43 may perform various processes based on information received from the electronic device 21. For example, when receiving the voice signal of the user utterance 11 from the electronic device 21, the server processor 43 may perform the voice recognition processing on the user utterance 11. The server processor 43 may acquire text data for the user utterance 11 based on the server voice assistance. The server processor 43 may transmit the acquired text data to the electronic device 21 to perform an operation corresponding to the text data.

Meanwhile, the processor 39 of the electronic device 21 or the server processor 43 of the server 4 may perform the voice recognition on the user utterance 11 based on the first voice assistance 26 or the server voice assistance, receive the information on the recognition characteristics of the second voice assistance 27 for the user utterance 11 from the external device 22, and perform at least part of the analysis and processing of data, and generation of the resulting information using at least one of machine learning, neural network, or deep learning algorithm as rule-based or artificial intelligence algorithm to adjust the recognition characteristics of the first voice assistance 26 based on information on the recognition characteristics of the second voice assistance 27.

For example, the processor 39 or the server processor 43 may perform functions of a learning unit and a recognition unit together. The learning unit may perform a function of generating a trained neural network, and the recognition unit may perform a function of recognizing (or reasoning, predicting, estimating, and determining) data using the trained neural network. The learning unit may generate or update the neural network. The learning unit may obtain training data to generate the neural network. For example, the learning unit may obtain the learning data from the storage 35 or the server storage 42 or from the outside. The learning data may be data used for training the neural network, and the neural network may be trained using the data performing the above-described operation as the training data.

Before learning the neural network using the learning data, the learning unit may perform a pre-processing operation on the obtained learning data, or select data to be used for learning from among a plurality of learning data. For example, the learning unit may process or filter the training data in a predetermined format, or add/remove noise to process data in a form suitable for training. The learning unit may generate a neural network configured to perform the above-described operation using the pre-processed training data.

The learned neural network may be constituted by a plurality of neural networks (or layers). The nodes of the plurality of neural networks have weights, and the plurality of neural networks may be connected to each other so that an output value of one neural network is used as an input value of another neural network. Examples of neural networks may include models such as a convolutional neural network (CNN), a deep neural network (DNN), a recurrent neural network (RNN), a restricted Boltzmann machine (RBM), a deep belief network (DBN), a bidirectional recurrent deep neural network (BRDNN), and deep Q-networks.

Meanwhile, in order to perform the above-described operation, the recognition unit may obtain target data. The target data may be obtained from the storage 35 or the server storage 42 or from the outside. The target data may be data to be recognized by the neural network. Before applying to the target data to the trained neural network, the recognition unit may perform the pre-processing operation on the obtained target data, or select data to be used for recognition from among a plurality of target data. For example, the recognition unit may process or filter the target data in a predetermined format, or add/remove noise to process data in a form suitable for recognition. The recognition unit may obtain an output value output from the neural network by applying the preprocessed target data to the neural network. The recognition unit may obtain a probability value or a reliability value along with the output value.

Figure 3:
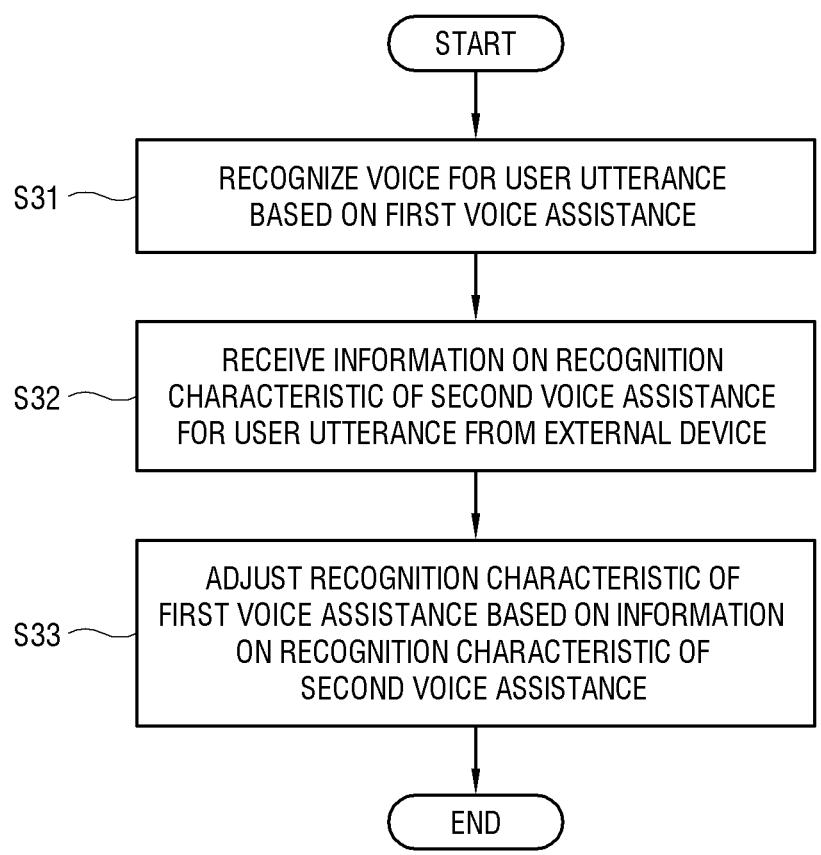
FIG. 3 is a diagram illustrating an example of a control method of the electronic device of FIG. 1.

FIG. 3 illustrates an example of a control method of the electronic device of FIG. 1. Each operation of FIG. 3 may be executed by the processor 39 of the electronic device 2. As illustrated in FIG. 3, the processor 39 may perform the voice recognition on the user utterance 11 based on the first voice assistance 26 (S31).

In addition, the processor 39 may receive the information on the recognition characteristic of the second voice assistance 27 for the user utterance 11 from the external device 22 (S32).

In addition, the processor 39 may adjust the recognition characteristics of the first voice assistance 26 based on the information on the recognition characteristics of the second voice assistance 27 (S33).

In this way, according to the control method of the present embodiment, it is possible to further improve the reliability of the voice recognition function by improving the suitability between the utterance intention and the recognition result of the user 1.

Figure 4:
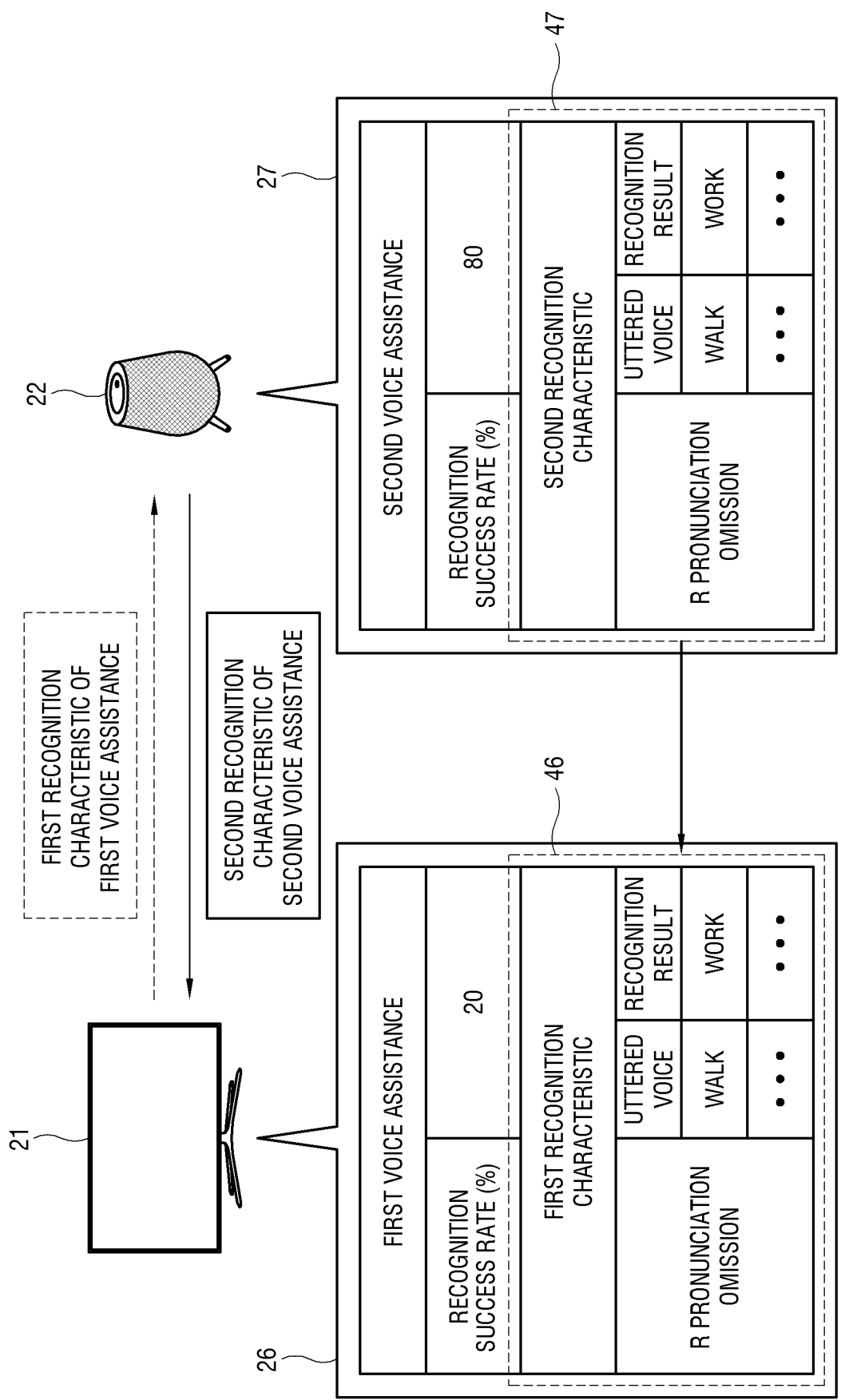
FIG. 4 is a diagram illustrating an example of adjusting recognition characteristics of voice assistance in connection with operation S33 of FIG. 3.

FIG. 4 illustrates an example of adjusting recognition characteristic of voice assistance in connection with operation S33 of FIG. 3. It is assumed that the types of the first voice assistance 26 and the second voice assistance 27 described below are the same. For example, the electronic device 21 and the external device 22 may be of the same type, or the voice recognition methods of the first voice assistance 26 and the second voice assistance 27 may be the same. However, the adjustment of the recognition characteristics described below may be applied to voice assistants having different types without being limited thereto.

As illustrated in FIG. 4, the second voice assistance 27 of the external device 22 may have a second recognition characteristic 47. The second recognition characteristic 47 may include, for example, the tendency of the user 1 to omit the so-called R pronunciation, in which the user pronounces "work" as "walk" instead of "work". For example, when the user 1 has the intention to watch Episode 3 of a drama titled "Work Man" and utters "Show Episode 3 of Walk Man", the external device 22 may acquire "Show Episode 3 of Work Man" as the recognition result based on the second recognition characteristic 47 of the second voice assistance 27 to which the tendency of the user 1 to omit the R pronunciation is reflected. The external device 22 may display, for example, Episode 3 of the drama "Work Man" based on the acquired recognition result.

The processor 39 of the electronic device 21 may adjust the first recognition characteristic 46 of the first voice assistance 26 according to the second recognition characteristic 47 of the second voice assistance 27 to which the tendency to omit R pronunciation is reflected. To this end, the processor 39 may receive the information on the second recognition characteristic 47 from the external device 22. The information on the second recognition characteristic 47 may include, for example, a voice recognition model representing the tendency to omit R pronunciation or a recognition characteristic parameter of the voice recognition model. Therefore, the processor 39 may change the recognition characteristic parameter of the first recognition characteristic 46 by referring to the recognition characteristic parameter of the second recognition characteristic 47 so that the first recognition characteristic 46 also has the tendency to omit R pronunciation.

If the processor 39 receives the user utterance 11 "Show Episode 4 Walk man", the processor 39 may acquire, as the recognition result, "Show Episode 4 Work Man" based on the first voice assistance 26 having the adjusted first recognition characteristic 46, and display, for example, Episode 4 of the drama "Work Man" according to the acquired recognition result.

The processor 39 may compare the recognition characteristics between the first voice assistance 26 and the second voice assistance 27 to determine whether to adjust the first recognition characteristic 46 according to the second recognition characteristic 47 of the second voice assistance 27. The comparison of the recognition characteristics may mean the degree of learning. When the second recognition characteristic 47 reflects the tendency to omit R pronunciation but the first recognition characteristic 46 does not reflect the tendency to omit R pronunciation, the processor 39 may identify that the degree of learning of the first voice assistance 26 is lower than that of the second recognition characteristic 47. In this case, the processor 39 may adjust the first recognition characteristic 46 according to the second recognition characteristic 47 of the second voice assistance 27.

Conversely, when the degree of learning of the first voice assistance 26 is higher than the learning degree of the second recognition characteristic 47, the processor 39 may not adjust the first recognition characteristic 46 according to the second recognition characteristic 47 of the second voice assistance 27. In this case, the processor 39 transmits the information on the first recognition characteristic 46 to the external device 22, and causes the external device 22 to adjust the second recognition characteristic 47 of the second voice assistance 27 based on the first recognition characteristic 46 of the first voice assistance 26.

As another example, the processor 39 may determine whether to adjust the first recognition characteristic 46 according to the second recognition characteristic 47 of the second voice assistance 27 based on the recognition success rates of each voice assistance. When the user 1 intends to watch Episode 1 of the drama "Lovers of Paris" and utters "Show Episode 1 of Lovers of PParis", based on the second voice assistance 27 having the second recognition characteristic 47 to which a so-called consonant reinforcement tendency to pronounce /p/ as /pp/ is reflected in connection with consonants, the recognition result "Show Episode 1 of "Lovers of Paris" is acquired, whereas based on the first recognition characteristic 46 of the first voice assistance 26 to which the consonant reinforcement tendency is not reflected, the recognition result "Show Episode 1 of Lovers of Paris" may not be acquired due to un-recognition or misrecognition, so there is the difference between the recognition success rates of each voice assistance.

In this case, if it is determined based on the difference between the recognition success rates that the recognition success rate of the first voice assistance 26 is lower than that of the second voice assistance 27, the processor 39 may adjust the first recognition characteristic 46 according to the second recognition characteristic 47 of the second voice assistance 27. For example, the processor 39 may reflect the consonant reinforcement tendency, which is reflected in the second recognition feature 47, to the first recognition feature 46.

As described above, since the processor 39 may determine whether to adjust the recognition characteristic based on the degree of learning between each voice assistance, the recognition success rate, and the like, the voice recognition function may be more efficiently improved.

Figure 5:
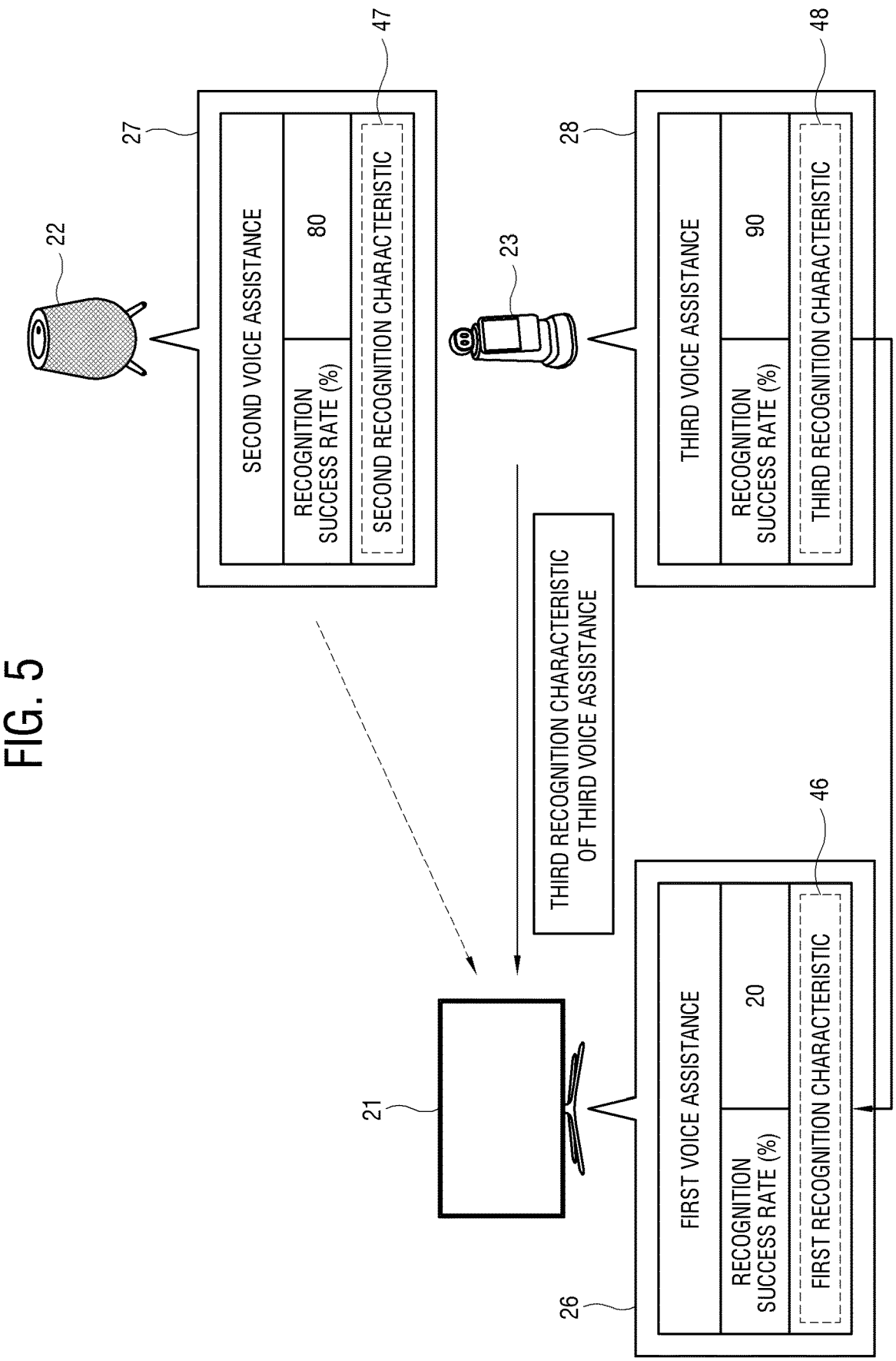
FIG. 5 is a diagram illustrating another example of adjusting the recognition characteristics of the voice assistance in connection with the operation S33 of FIG. 3.

FIG. 5 illustrates another example of adjusting the recognition characteristics of the voice assistance in connection with the operation S33 of FIG. 3. As illustrated in FIG. 5, the second voice assistance 27 of the external device 22 may have the second recognition characteristic 47, and the third voice assistance 28 of the another external device 23 may have a third recognition characteristic 48.

According to the recognition success rate between the second voice assistance 27 of the external device 22 and the third voice assistance 28 of another external device 23, the processor 39 of the electronic device 21 may adjust the first recognition characteristic 26 based on any one of the second recognition characteristic 47 and the third recognition characteristic 48. For example, when the recognition success rate of the second voice assistance 27 of the external device 22 is lower than that of the third voice assistance 28 of another external device 23, the processor 39 may adjust the first recognition characteristic 26 based on the third voice assistance 28 of another external device 23. To this end, the processor 39 may receive the information on the third recognition characteristic 48 of the third voice assistance 28 from another external device 23, and adjust the first recognition characteristic 26 based on the received information.

Figure 6:
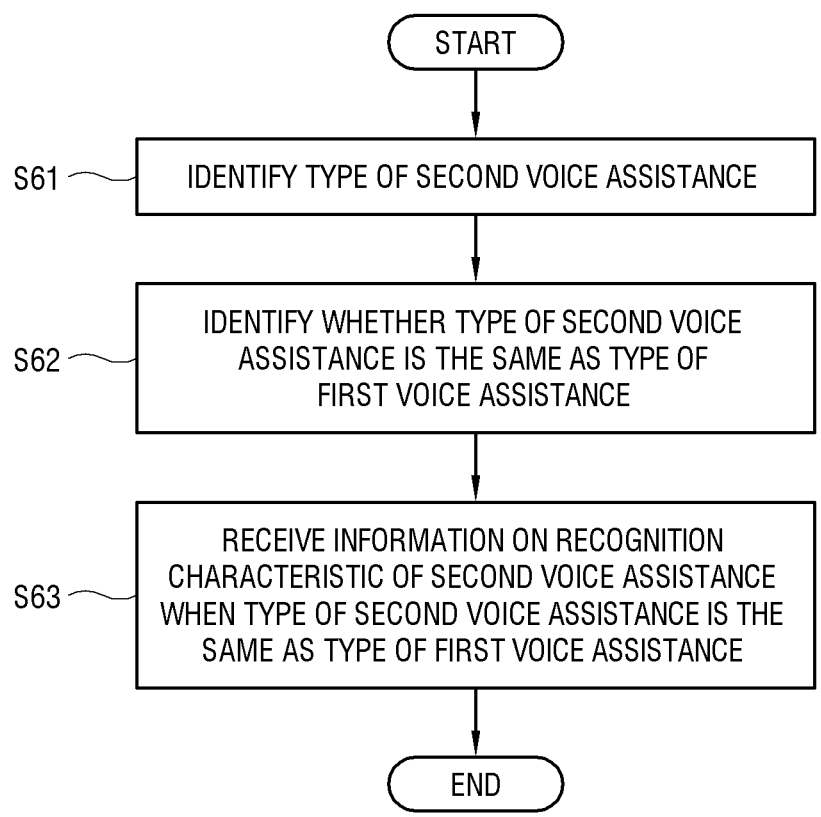
FIG. 6 is a diagram illustrating an example of a control method of an electronic device that identifies a type between voice assistances.

FIG. 6 illustrates an example of a control method of an electronic device that identifies a type between voice assistances. In the following, for convenience of description, each operation of FIG. 6 will be briefly described as an operation of the processor 39.

The processor 39 may identify the type of the second voice assistance 27 (S61). Here, the type may include a type of voice assistance, a type of a voice recognition method, a type of device, a type of manufacturer, and the like.

Further, the processor 39 may identify whether the type of the second voice assistance is the same as the type of the first voice assistance (S62). For example, the processor 39 may identify whether each voice assistance is the same type according to whether each voice assistance is the same type, whether the voice assistance methods are the same, whether the voice assistance is installed in the same device, whether the voice assistance is manufactured by the same manufacturer, or the like.

In addition, when the type of the second voice assistance 27 is the same as the type of the first voice assistance 26, the processor 39 may receive information on the recognition characteristics of the second voice assistance 47 (S63).

In this way, since the processor 39 may adjust the first recognition characteristic 46 when the types between the first voice assistance 26 and the second voice assistance 27 are the same, the processor 39 may prevent that the information on the recognition characteristics of the second voice assistance 47 is received despite the incompatibility between the first recognition characteristic 46 and the second recognition characteristic 47 when the types are different, thereby more efficiently improving the voice recognition function.

Figure 7:
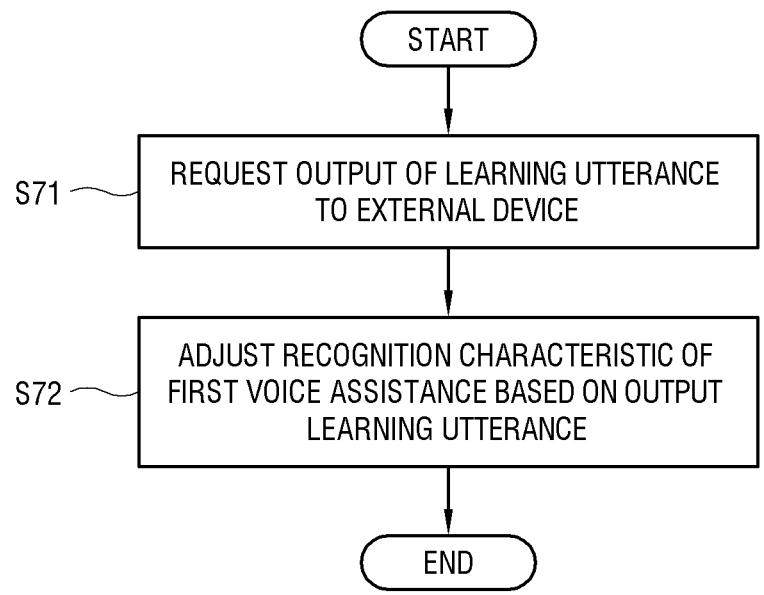
FIG. 7 is a diagram illustrating an example of adjusting the recognition characteristics of the voice assistance based on learning utterance.

FIG. 7 illustrates an example of adjusting the recognition characteristics of the voice assistance based on learning utterance. In the following, for convenience of description, each operation of FIG. 7 will be briefly described as an operation of the processor 39.

The processor 39 may request the external device 22 to output learning utterance (S71). For example, the processor 39 may transmit the information corresponding to the learning utterance to the external device 22.

In addition, the processor 39 may adjust the first recognition characteristic 46 of the first voice assistance 26 based on the learning utterance output from the external device 22 in response to the output request. For example, the processor 39 may adjust the first recognition characteristic 46 of the first voice assistance 26 based on the transmitted information (S72).

In this way, since the processor 39 may adjust the recognition characteristics, that is, learn the recognition characteristics based on the learning utterance output from the external device 22 in response to the output request or based on the information transmitted to the external device 22, it is less restrictive and it is possible to perform more diverse learning than the case of using the user utterance 11 from the user 1 or performing the self-learning. Therefore, it is possible to improve the reliability of the voice recognition function through the improvement of the voice recognition performance.

Figure 8:
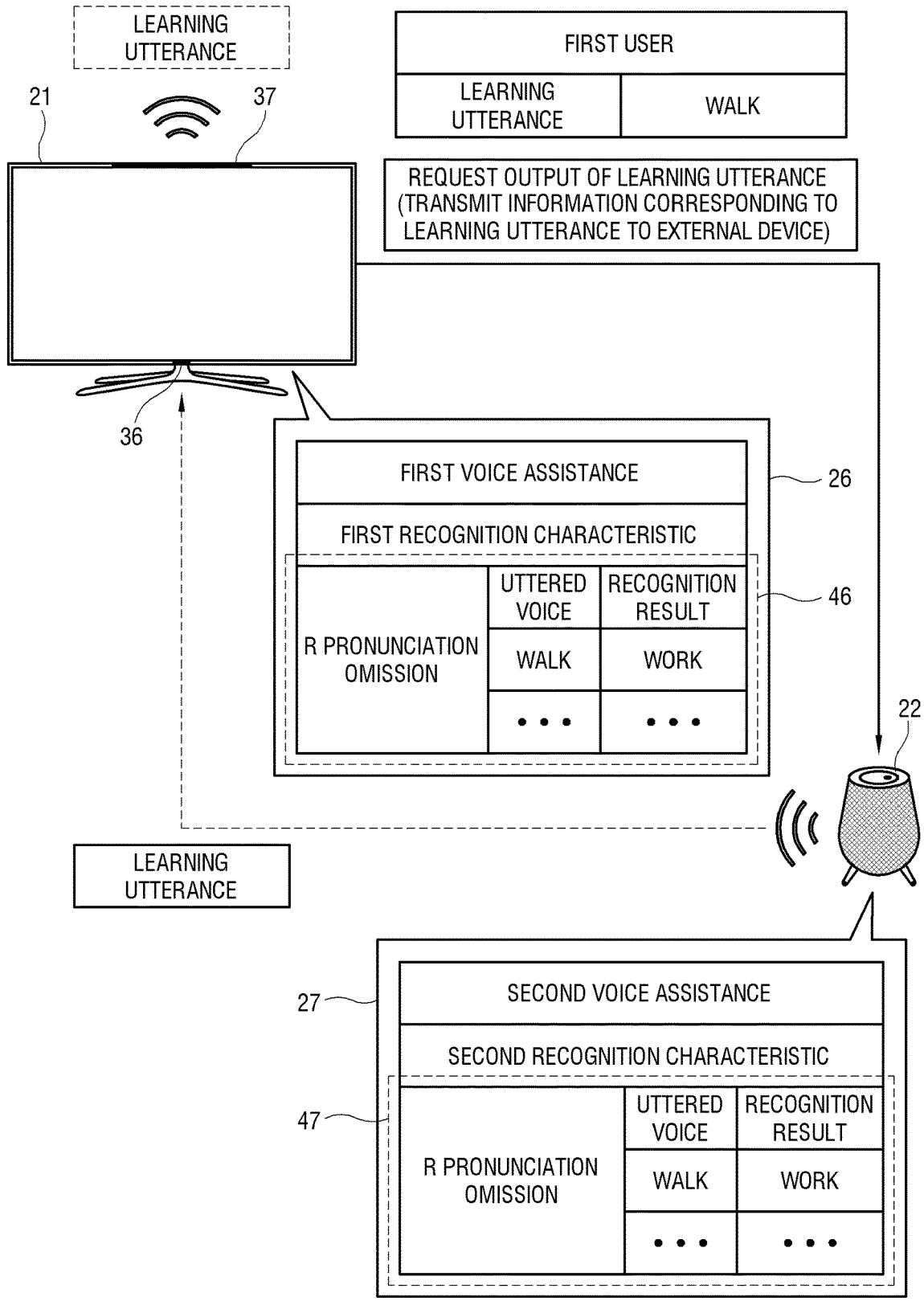
FIG. 8 is a diagram illustrating an example of adjusting the recognition characteristics of the voice assistance in connection with operation S72 of FIG. 7.

FIG. 8 illustrates an example of adjusting the recognition characteristics of the voice assistance in connection with operation S72 of FIG. 7. As illustrated in FIG. 8, the second voice assistance 27 of the external device 22 may have the second recognition characteristic 47. In the following description, for convenience of explanation, the second recognition characteristic 47 of the second voice assistance 27 reflects the tendency to omit the R pronunciation to the user utterance 11, whereas the first recognition characteristic 46 of the first voice assistance 26 of the electronic device 21 does not reflect the tendency to omit R pronunciation.

When the first user 1 intends to watch Episode 3 of the drama titled "Work Man" and utters "Show Episode 3 of Walk Man", the processor 39 of the electronic device 21 may cause the un-recognition or misrecognition for "Show Episode 3 of Walk Man" in a situation where the first recognition characteristic 46 of the first voice assistance 26 does not reflect the tendency to omit the R pronunciation. The processor 39 may store the unrecognized or misrecognized "Show Episode 3 of Walk Man" in the storage 35.

The processor 39 may identify what recognition result the external device 22 outputs for the unrecognized or misrecognized "Show Episode 3 of Walk Man", and perform learning to adjust the first recognition characteristic 46 of the first voice assistance 26 based on the recognition result of the external device 22. To this end, the processor 39 may transmit, to the external device 22, a signal requesting to output the recognition result of the learning utterance, for example, "Show Episode 3 of Walk Man". For example, the processor 39 may transmit the information corresponding to the "Show Episode 3 of Walk Man" to the external device 22.

In this case, the processor 39 may first output a so-called trigger in order to switch the external device 22 from a standby mode to a normal mode in which the voice recognition is possible. To this end, the processor 39 may identify the type of the external device 22 and output the trigger corresponding to the identified type as audio through the audio output interface 37.

The external device 22 that receives a request to output the learning utterance for "Show Episode 3 of Walk Man" or receives the information corresponding to "Show Episode 3 of Walk Man" may identify that the "Show Episode 3 for Walk Man" is "episode 3 for Work Man" based on the second voice assistance 27 to which the tendency to omit the R pronunciation is reflected and output the learning utterance, that is, the "episode 3 for Work Man", as previously assumed.

The processor 39 of the electronic device 21 may receive the learning utterance output from the external device 22 through the audio receiver 36, and identify that the recognition result of the unrecognized or misrecognized "Show Episode 3 of Walk Man" is the "Show Episode 3 of Work Man". That is, the processor 39 may identify that the tendency to omit R pronunciation is reflected to the second recognition characteristic 47 of the second voice assistance 27, whereas the first voice assistance 26 may identify that the tendency to omit the R pronunciation is not reflected to the first recognition characteristic 46. The processor 39 may reflect the tendency to omit the R pronunciation to the first recognition characteristic 46 based on the identification result.

However, when the processor 39 requests the output of the learning utterance to the external device 22 in order to adjust the first recognition characteristic 46 of the first voice assistance 26, since the processor 39 is not limited to transmitting, the processor 39 may control to directly output the audio requesting the learning utterance. For example, the processor 39 may directly output the unrecognized or misrecognized "Show Episode 3 of Walk Man" through the audio output interface 37. Similarly, the processor 39 may first output a trigger for switching the external device 22 from the standby mode to the normal mode.

In this case, the external device 22 may perform the voice recognition processing on "Show Episode 3 of Walk Man" based on the second voice assistance 27, and acquire "Show Episode 3 of Work Man" as the recognition result. The external device 22 may output an operation according to the acquired recognition result, for example, the learning utterance "Would you like to display Episode 3 of Work Man?".

The processor 39 of the electronic device 21 may receive the learning utterance "Would you like to display Episode 3 of Work Man" output from the external device 22 through the audio receiver 36, and reflect the tendency to omit the R pronunciation to the first recognition characteristic 46 by comparing the unrecognized or misrecognized "Show Episode 3 of Walk Man" and "Would you like to display Episode 3 of Work Man" that is the learning utterance from the external device 22.

In the example described above, the processor 39 of the electronic device 21 may request the output of the learning utterance to the external device 22 or adjust the first recognition characteristic 46 of the first voice assistance 26 based on the information transmitted to the external device 22, but the processor 39 may cause the external device 22 to output the learning utterance and adjust the second recognition characteristic 47 of the second voice assistance 27 based on the learned utterance. For example, it is assumed that the tendency to omit the R pronunciation is reflected to the first recognition characteristic 46, but is not reflected to the second recognition characteristic 47. The processor 39 may intentionally output "Show Episode 3 of Walk Man" as the learning utterance in order to check whether the tendency to omit the R pronunciation is reflected.

The external device 22 may cause the un-recognition or misrecognition for "Show Episode 3 of Work Man" based on the second voice assistance 27. When the external device 22 does not perform an operation according to the voice recognition or urges to the utterance again, the processor 39 may identify that the unrecognized or misrecognized "Show Episode 3 of Walk Man" is caused. The processor 39 may identify that the tendency to omit the R pronunciation is not reflected to the second recognition characteristic 47 based on the un-recognition or misrecognition generated by the external device 22, and transmit the information on the first recognition characteristic 46 to the external device 22 so that the information on the tendency to omit the first recognition characteristic 46 may be reflected to the second recognition characteristic 47 based on the identification result.

However, the processor 39 is not limited to outputting the "Show Episode 3 of Walk Man" as the learning utterance by identifying whether the tendency to omit the R pronunciation is reflected to the second recognition characteristic 47 of the second voice assistance 27, and therefore, may output, for example, the "Show Episode 3 of Walk Man" as the learning utterance when receiving the request to output "Show Episode 3 of Walk Man" as the learning utterance from the external device 22.

Meanwhile, since the plurality of external devices 22 may be provided, the processor 39 of the electronic device 21 may request the output of the learning utterance from each of the plurality of external devices 22, 23, and 24, or transmit the information corresponding to the learning utterance. The processor 39 may adjust the first recognition characteristic 46 of the first voice assistance 26 based on the learning utterance output from the plurality of external devices 22, 23, and 24, respectively, based on the output request or the transmitted information. That is, the processor 39 may identify whether to reflect the degrees of learning of each voice assistance, such as the tendency to omit the R pronunciation and the tendency to enhance consonants, based on the learning utterance output from each of the plurality of external devices 22, 23, and 24, respectively, and adjust the first recognition characteristic 46 of the first voice assistance 26 based on the identified degree of learning.

Meanwhile, the processor 39 may determine the order in which each of the plurality of external devices 22, 23, and 24 outputs the learning utterance through the output request or the information transmission described above, and may cause the plurality of external devices 22, 23, and 24, respectively, to output the learning utterance according to the predetermined order.

Figure 9:
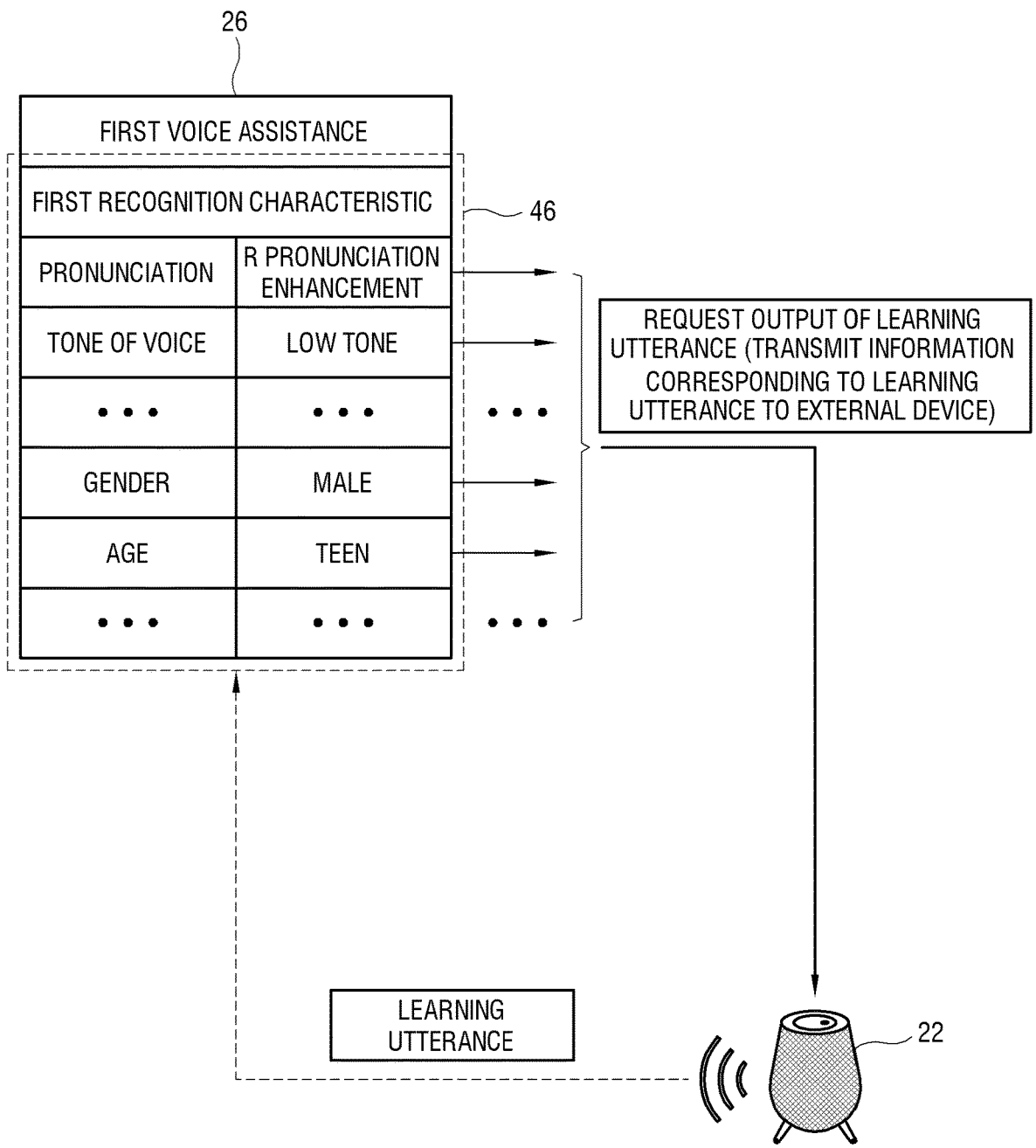
FIG. 9 is a diagram illustrating an example of adjusting the recognition characteristics of the voice assistance according to the recognition characteristics in connection with the operation S72 of FIG. 7.

FIG. 9 illustrates an example of adjusting the recognition characteristics of the voice assistance according to the recognition characteristics in connection with the operation S72 of FIG. 7. As illustrated in FIG. 9, the first recognition characteristic 46 of the first voice assistance 26 may be adjusted for each voice characteristic and for each user characteristic. In other words, the first recognition feature 46 may include the voice recognition model, and the voice recognition model may be provided for each voice feature and for each user feature. For example, in the case of the voice characteristic, the first recognition characteristic 46 may reflect the tendency to omit the R pronunciation, the tendency to enhance consonants, or the like, or to reflect a tendency that a tone is low. However, the first recognition characteristic 46 may be provided to reflect various types of voice characteristics without being limited thereto. In addition, in the case of the user characteristics, the first recognition characteristic 46 may reflect that a gender is male or that an age is in the teens. Similarly, the first recognition characteristic 46 may be provided to reflect various types of user characteristics.

As described with reference to FIG. 8, the processor 39 may cause, for example, the external device 22 to output the learning utterance for each voice characteristic and user characteristic based on the output request of the learning utterance to the external device 22 or the transmission of information in response to the learning utterance. In this case, the requested learning utterance may include an unrecognized or misrecognized user utterance 11.

For example, in the case of performing the learning in association with the tone, the processor 39 may request the external device 22 to output the unrecognized or misrecognized low-tone user utterance 11. The external device 22 may output the low-pitched learning utterance according to the request of the processor 39, and the processor 39 may adjust the first recognition characteristic 46 in association with the tone by learning based on the learning utterance.

The processor 39 may not only learn the unrecognized or misrecognized low-pitched user utterance 11, but also cause the external device 22 to output the learning utterance whose tone has been changed, thereby performing additional learning. For example, the processor 39 may cause the external device 22 to output the learning utterance with a lower tone than the unrecognized or misrecognized low tone.

Figure 10:
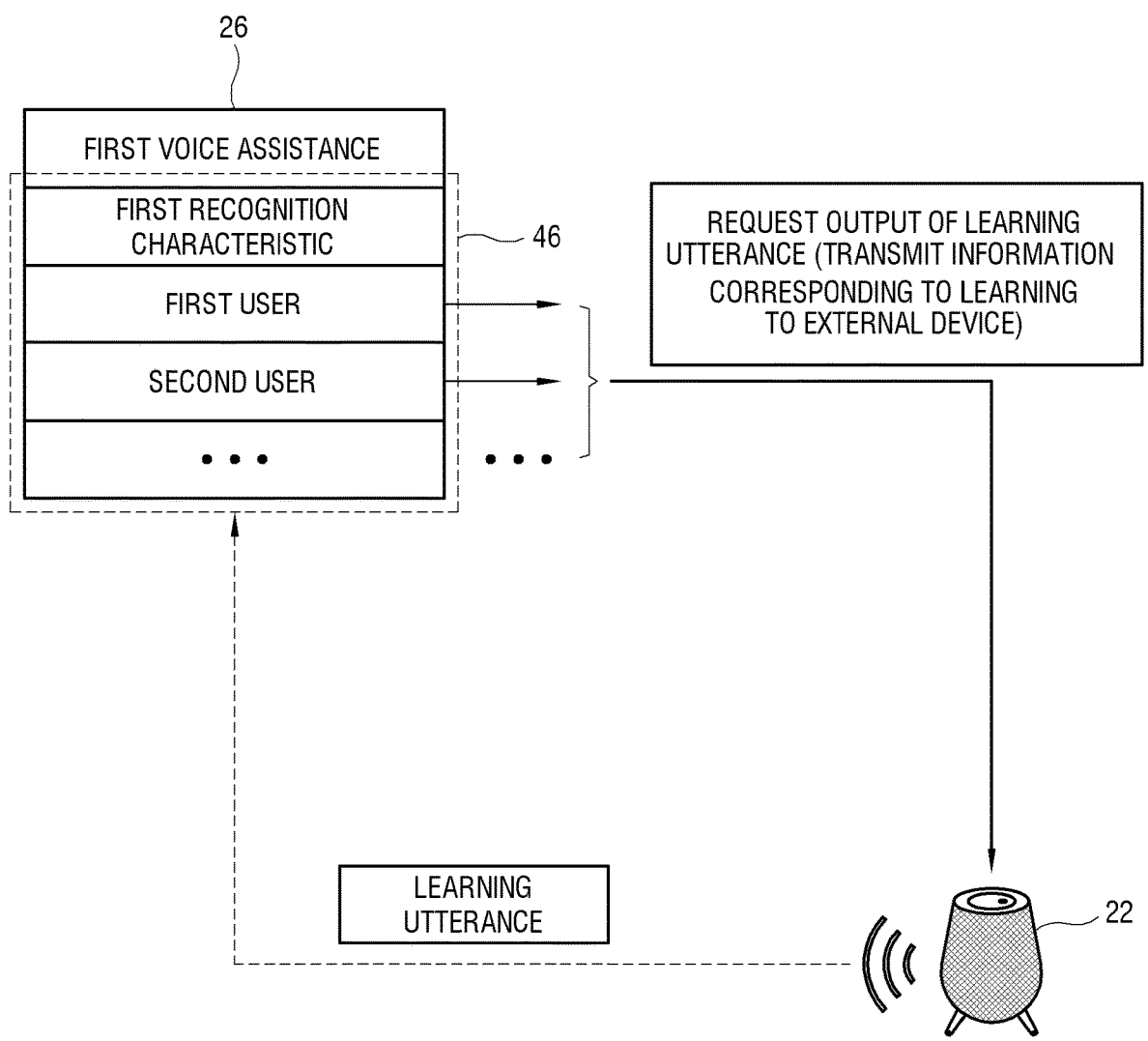
FIG. 10 is a diagram illustrating an example of adjusting the recognition characteristics of the voice assistance for each user in connection with the operation S72 of FIG. 7.

FIG. 10 illustrates an example of adjusting the recognition characteristics of the voice assistance for each user in connection with the operation S72 of FIG. 7. As illustrated in FIG. 10, the first recognition characteristic 46 of the first voice assistance 26 may be provided for each user. That is, the first recognition characteristic 46 may include the recognition characteristics of the first user 1, the recognition characteristics of the second user, and the like.

As described in connection with FIG. 8, the processor 39 may request the output of the learning utterance to the external device 22 or transmit the information corresponding to the learning utterance, and thus, request, for example, the external device 22 to output the learning utterance for each user. For example, the processor 39 may request the external device 22 to output the learning utterance in association with the user utterance 11 of the first user 1, and learn and adjust the recognition characteristics of the first user 1 based on the learning utterance output from the external device 22. Similarly, the processor 39 may learn and adjust the recognition characteristics of the second user based on the learning utterance output from the external device 22 in association with the user utterance of the second user.

In addition, the processor 39 may learn to improve the recognition success rate for the user 1 through the learning utterance from the external device 22. The processor 39 may recognize the user 1 based on the learning utterance, and cause the external device 22 to output the learning utterance with, for example, a lower tone than the requested learning utterance for the user utterance 11, and thus may perform the learning to recognize the user 1 based on various learning utterances.

Figure 11:
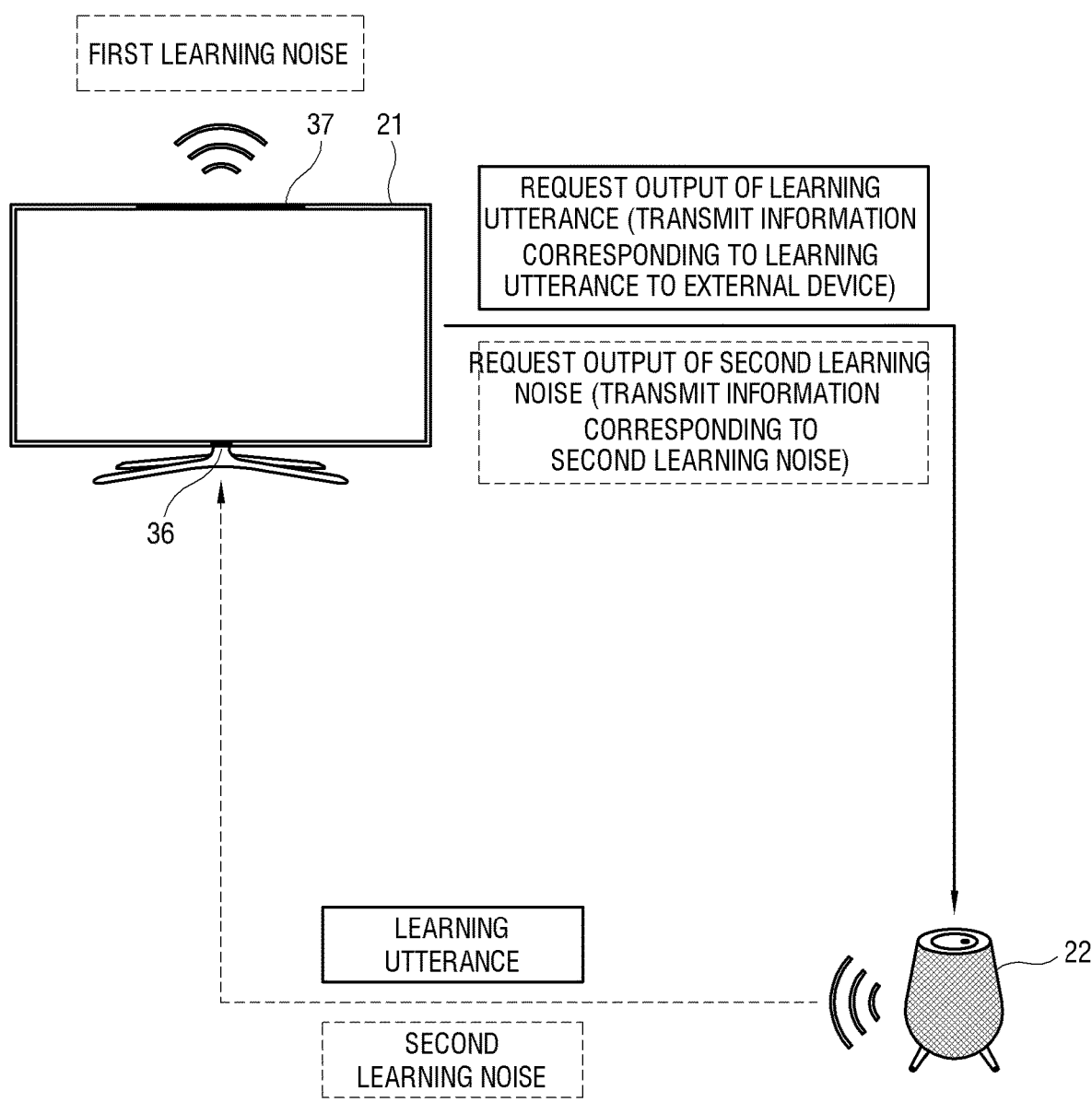
FIG. 11 is a diagram illustrating an example of adjusting the recognition characteristics of the voice assistance based on learning noise in connection with the operation S72 of FIG. 7.

FIG. 11 illustrates an example of adjusting the recognition characteristics of the voice assistance based on learning noise in connection with the operation S72 of FIG. 7. As illustrated in FIG. 11, the processor 39 may request the output of the second learning noise to the external device 22 or transmit the information corresponding to the second learning noise. The processor 39 may store the unrecognized or misrecognized situation information of the user utterance 11. The context information may include environmental noise received together with the user utterance 11, environmental noise received before and after the user utterance 11, and the like. That is, the processor 39 may reproduce the unrecognized or misrecognized situation by causing the external device 22 to output the environmental noise as the second learning noise through the output request of the learning utterance or the transmitted information. Since the processor 39 may output the second learning noise in various combinations, not only the previously collected environmental noise, but also new environmental noise may be arbitrarily generated.

Meanwhile, the processor 39 may directly output the first learning noise. In this case, the processor 39 causes the external device 22 to output only the learning utterance or output the second learning noise, thereby performing the learning in various situations.

Figure 12:
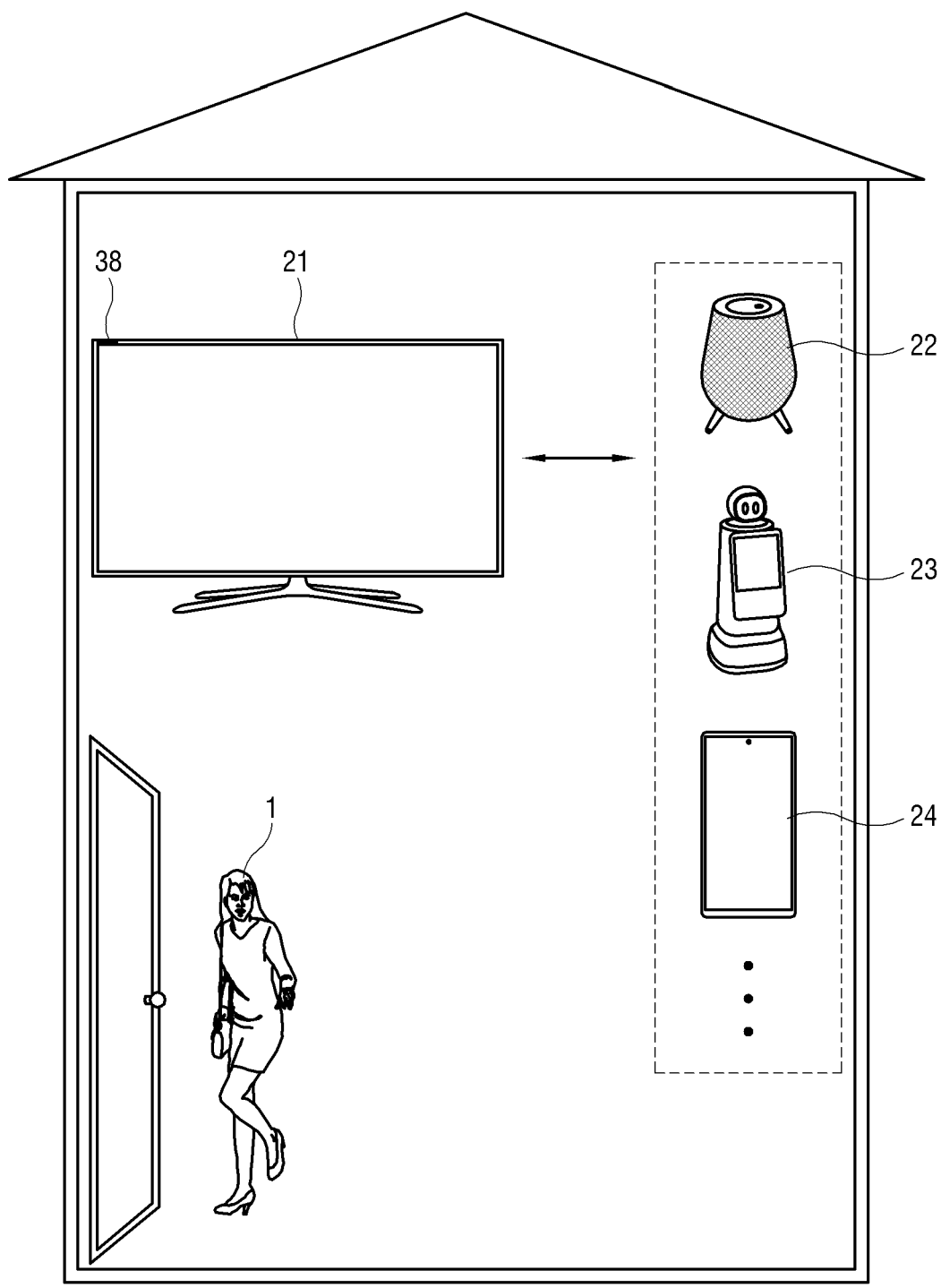
FIG. 12 is a diagram illustrating an example of adjusting the recognition characteristics of the voice assistance when a user is absent in connection with the operation S72 of FIG. 7.

FIG. 12 illustrates an example of adjusting the recognition characteristics of the voice assistance when a user is absent in connection with the operation S72 of FIG. 7. As illustrated in FIG. 12, it is assumed that the electronic device 21 and the external device 22 are installed in the home. However, the electronic device 21 and the external device 22 may exist in various installation environments such as an office without being limited thereto.

The processor 39 may identify whether the user 1 exists in the home, that is, whether the user 1 is out through the sensor 38. Since the sensor 38 may be implemented as a distance sensor, a direction sensor, a camera, or the like, it is possible to identify the presence or absence of the in-house user 1 according to various detection methods. However, the processor 39 may receive information on the presence or absence of the user 1 from other devices, for example, a plurality of external devices 22, 23, and 24 without being limited thereto.

The processor 39 may use an account of the user 1, for example, an account of service used by the user 1 through the electronic device 21, or the account of the service used through the external device 22 or the like to identify whether the user 1 exists in the home. For example, when the user uses a social network service using the smartphone 24, the processor 39 may directly use an account of the social network service, or receive, from the smartphone 24, the information that the smartphone 24 acquires using the account of the social network service to identify that the user 1 is out.

In the absence of the user 1, the processor 39 may adjust the first recognition characteristic 46 of the first voice assistance 26 through the learning utterance described above. That is, the processor 39 may request the output of the learning utterance to the external device 22 or transmit the information corresponding to the learning utterance in the absence of the user 1, and adjust the first recognition characteristic 46 of the first voice assistance 26 based on the output request or the transmitted information. This is to prevent discomfort that may be given to the user 1 due to the learning utterance and the learning noise. Therefore, depending on the design method, the processor 39 may stop the learning which is in progress until the user (1) leaves the home even during the learning through the learning utterance if it is determined that the user 1 is in the home.

Figure 13:
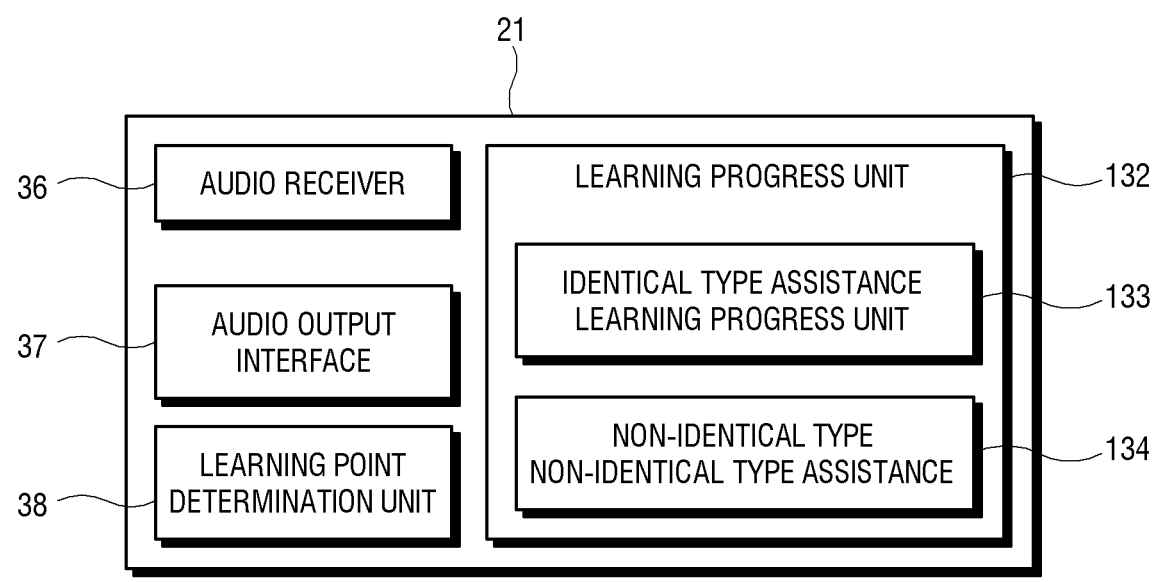
FIG. 13 is a diagram illustrating the electronic device according to the embodiment of the disclosure.

FIG. 13 illustrates the electronic device according to the embodiment of the disclosure. As illustrated in FIG. 13, the electronic device 21 may include an audio receiver 36, an audio output interface 37, a learning point determination unit 131, and a learning progress unit 132. Hereinafter, descriptions overlapping with the configuration illustrated in FIG. 2 will be omitted, and different configurations will be mainly described in detail. However, since the configuration of the electronic device 21 according to the present embodiment is not limited to FIG. 13, some components may be excluded or components not illustrated may be added according to the design method.

When a learning mode is executed, the learning point determination unit 131 may identify whether the learning for the first voice assistance 26 is possible. The learning mode may be executed according to the user selection, but is not limited thereto, and thus may be executed at a predetermined cycle or at a specific time. As an example, the learning point determination unit 131 may identify whether the user 1 is absent, and identify the absence of the user 1 as a learnable time. The learning point determining unit 131 may identify whether the user 1 is absent based on the information acquired through the audio receiver 36 and the sensor 38. For example, the learning point determination unit 131 may identify the movement of the user 1 through the sensor 38 or whether the user 1 is absent based on environmental noise such as a cleaner sound through the audio receiver 36. When it is identified whether the user 1 is absent through the audio receiver 36, a signal-to-noise ratio may be calculated or a voice activity detection module may be used. However, the learning point determination unit 131 may identify whether the user 1 is absent by identifying a schedule, a service use history, and the like of the user 1 based on the service account of the user 1. The service account may include not only those used by the electronic device 21 but also those used by the external device 22.

The learning progress unit 132 may progress the learning for the first voice assistance 26. However, the learning progress unit 132 may alternately learn the first voice assistance 26 and the second voice assistance 27 without being limited thereto, and when there are the plurality of second voice assistances 27, the number of second voice assistances may be identified, and the order in which the learning is progressed may be defined depending on the identified number.

The learning progress unit 132 may request the external device 22 to output the learning utterance, and may update the first voice assistance 26 based on the learning utterance output from the external device 22. The learning utterance may be a trigger, but is not limited thereto, and the appropriate utterance, for example, the unrecognized or misrecognized utterance may be selected to update the first voice assistance 26. The update may include the adjustment of the first recognition characteristic 46 of the first voice assistance 26.

The learning progress unit 132 may transmit a signal to the external device 22 or may directly output audio in order to request the output of the learning utterance. When the audio is directly output to request the output of the learning utterance, the identical type assistance learning progress unit 133 may perform acoustic echo cancellation.

The learning progress unit 132 may request the external device 22 to output the learning utterance while changing the volume of the learning utterance. However, the learning progress unit 132 may request the external device 22 to output various characteristics for the learning utterance, such as intensity, voice of tone, tone, and pronunciation while changing the various characteristics without being limited thereto.

The learning progress unit 132 may request the external device 22 to output the environmental noise at the time of receiving, for example, the unrecognized or misrecognized utterance to progress the learning in the state in which the situation at the time of receiving the unrecognized or misrecognized utterance is reproduced. The environmental noise may include not only artificial sounds such as the cleaner sound, but also natural sounds such as rain sound and wind sound.

The learning progress unit 132 may identify the recognition characteristics of the first voice assistance 26 or the second voice assistance 27 through the above-described learning process, and may perform an operation to complement the recognition characteristics.

The learning progress unit 132 may include the identical type assistance learning progress unit 133 and the non-identical type assistance learning progress unit 134. The learning progress unit 132 may identify the types of the first voice assistance 26 and the second voice assistance 27. If the types are the same, the identical type assistance learning processing unit 133 may perform the operation of the learning processing unit 132 described above.

On the other hand, when the types are not the same, the learning process may be performed between the first voice assistance 26 and the second voice assistance 27 by the non-identical type assistance learning progress unit 134. For example, the non-identical type assistance learning progress unit 134 may output the trigger corresponding to the type of the second voice assistance 27 as audio to wake up different types of the second voice assistances 27 from the standby mode to the normal mode in which the voice recognition is possible.

If the second voice assistance 27 responds to the trigger, the non-identical type assistance learning progress unit 134 may perform the learning process of the learning progress unit 134 described above. For example, the non-identical type assistance learning progress unit 134 may directly output audio to request the output of the learning utterance, and adjust the first recognition characteristic 46 or the second recognition characteristic 47 based on the learning utterance output from the external device 22.

When adjusting the first recognition characteristic 46 of the first voice assistance 26 based on the second voice assistance 27, the non-identical type assistance learning progress unit 134 may notify the identical type assistance learning progress unit 133 of the adjusted situation to cause the identical type assistance learning progress unit 133 to adjust the second recognition characteristic 47 of the identical type second voice assistance 27.

Various embodiments disclosed in the disclosure may be implemented as software including one or more instructions stored in a storage medium that may be read by a machine such as the electronic device 21. For example, the processor 39 of the electronic device 21 may call and execute at least one instruction among one or more instructions stored from the storage medium. This makes it possible for a device such as the electronic device 21 to be operated to perform at least one function according to the at least one command called. The one or more instructions may include codes generated by a compiler or codes executable by an interpreter. The machine-readable storage medium may be provided in a form of a non-transitory storage medium. Here, the 'non-transitory' means that the storage medium is a tangible device, and does not include a signal (for example, electromagnetic waves), and the term does not distinguish between the case where data is stored semi-permanently on a storage medium and the case where data is temporarily stored thereon.

According to an embodiment, the methods according to the diverse embodiments disclosed in the document may be included and provided in a computer program product. The computer program product according to the disclosure may include instructions of software executed by a processor, as described above. The computer program product may be traded as a product between a seller and a purchaser. The computer program product may be distributed in the form of a machine-readable storage medium (for example, CD-ROM), or may be distributed (for example, download or upload) through an application store (for example, Play Store™) or may be directly distributed (for example, download or upload) between two user devices (for example, smartphones) online. In case of the online distribution, at least a portion of the computer program product may be at least temporarily stored in a storage medium such as a memory of a server of a manufacturer, a server of an application store, or a relay server or be temporarily generated.

Hereinabove, the disclosure has been described in detail through the preferred embodiments, but the disclosure is not limited thereto and may be implemented in various ways within the scope of the claims.

What is claimed is:

1. An electronic device, comprising:
a communication interface; and
a processor to:
perform a first voice recognition on a user voice input using a first voice assistance,
based on obtaining a result corresponding to the first voice recognition on the user voice input being unsuccessful using the first voice assistance and obtaining a result corresponding to a second voice recognition on the user voice input being successful using a second voice assistance, receive information on recognition characteristic of the second voice assistance for the user voice input from an external device through the communication interface, and
adjust recognition characteristic of the first voice assistance based on the received information on the recognition characteristic of the second voice assistance.

2. The electronic device of claim 1, wherein when a recognition success rate of the second voice assistance is higher than a recognition success rate of the first voice assistance, the processor adjusts the recognition characteristic of the first voice assistance to correspond to the recognition success rate of the second voice assistance.

3. The electronic device of claim 2, wherein the processor adjusts the recognition characteristic of the first voice assistance based on information on the recognition characteristic of the second voice assistance having a highest recognition success rate among a plurality of recognition characteristics of the second voice assistance.

4. The electronic device of claim 1, wherein the processor identifies a type of the second voice assistance, and receives the information on the recognition characteristic of the second voice assistance through the communication interface when the identified type of the second voice assistance is same as a type of the first voice assistance.

5. The electronic device of claim 1, wherein the processor controls information corresponding to learning utterance to be transmitted to the external device through the communication interface, and adjusts the recognition characteristic of the first voice assistance based on the transmitted information.

6. The electronic device of claim 5, wherein the learning utterance is provided for a plurality of different voice characteristics, respectively.

7. The electronic device of claim 6, wherein a voice characteristic among the plurality of different voice characteristics includes a respective user's voice characteristic.

8. The electronic device of claim 5, wherein the processor controls a first learning noise to be output, and adjusts the recognition characteristic of the first voice assistance based on the output first learning noise.

9. The electronic device of claim 5, wherein the external device is a first external device, and the processor controls information corresponding to a second learning noise to be transmitted to a second external device through the communication interface, and adjusts the recognition characteristic of the first voice assistance based on the information corresponding to the second learning noise.

10. The electronic device of claim 5, wherein the processor receives a request to output the learning utterance from the external device through the communication interface, and controls the learning utterance to be output.

11. The electronic device of claim 5, wherein the processor transmits the information on the recognition characteristic of the first voice assistance to the external device through the communication interface.

12. The electronic device of claim 5, wherein the processor controls to transmit the information corresponding to the learning utterance to the external device through the communication interface when the user is absent.

13. A control method of an electronic device, comprising:
performing a first voice recognition on a user voice input using a first voice assistance;
based on obtaining a result corresponding to the first voice recognition on the user voice input being unsuccessful using the first voice assistance and obtaining a result corresponding to a second voice recognition on the user voice input being successful using a second voice assistance, receiving information on recognition characteristic of the second voice assistance for the user voice input from an external device; and
adjusting recognition characteristic of the first voice assistance based on the received information on the recognition characteristic of the second voice assistance.

14. The control method of claim 13, wherein the adjusting of the recognition characteristic of the first voice assistance includes:
adjusting the recognition characteristic of the first voice assistance to correspond to a recognition success rate of the second voice assistance when the recognition success rate of the second voice assistance is higher than a recognition success rate of the first voice assistance.

15. The control method of claim 14, wherein the adjusting of the recognition characteristic of the first voice assistance to correspond to the recognition success rate of the second voice assistance includes:
adjusting the recognition characteristic of the first voice assistance based on the information on the recognition characteristic of the second voice assistance having a highest recognition success rate among a plurality of recognition characteristics of the second voice assistance.

16. The control method of claim 13, wherein the receiving of the information on the recognition characteristic of the second voice assistance includes:
identifying a type of the second voice assistance; and
receiving the information on the recognition characteristic of the second voice assistance when the identified type of the second voice assistance is same as a type of the first voice assistance.

17. The control method of claim 13, further comprising:
transmitting information corresponding to learning utterance to the external device,
wherein the adjusting of the recognition characteristic of the first voice assistance includes adjusting the recognition characteristic of the first voice assistance based on the transmitted information.

18. The control method of claim 17, wherein the learning utterance is provided for a plurality of different voice characteristics, respectively.

19. The control method of claim 17, wherein a voice characteristic among a plurality of different voice characteristics includes a respective user's voice characteristic.

20. A non-transitory computer-readable recording medium which stores a computer program including a computer-readable code to perform a control method of an electronic device, comprising:
performing a first voice recognition on a user voice input using a first voice assistance;
based on obtaining a result corresponding to the first voice recognition on the user voice input being unsuccessful using the first voice assistance and obtaining a result corresponding to a second voice recognition on the user voice input being successful using a second voice assistance, receiving information on recognition characteristic of the second voice assistance for the user voice input from an external device; and
adjusting recognition characteristic of the first voice assistance based on the received information on the recognition characteristic of the second voice assistance.

* * * * *